United States Patent [19]

Eardley

[11] Patent Number: 4,982,889
[45] Date of Patent: Jan. 8, 1991

[54] FLOATING DUAL DIRECTION SEAL ASSEMBLY

[75] Inventor: Edward P. Eardley, North Tonawanda, N.Y.

[73] Assignee: Union Carbide Corporation, Danbury, Conn.

[21] Appl. No.: 391,166

[22] Filed: Aug. 9, 1989

[51] Int. Cl.⁵ .............................................. F16J 15/48
[52] U.S. Cl. ...................................... 277/27; 277/177; 277/214
[58] Field of Search ................. 277/27, 177, 173, 168, 277/214, 215

[56] References Cited

U.S. PATENT DOCUMENTS

| | | | |
|---|---|---|---|
| 3,144,253 | 8/1964 | Schirmer | 277/27 |
| 3,363,910 | 1/1968 | Toronchuk | 277/27 |
| 3,887,198 | 6/1975 | McClure et al. | 277/27 |
| 4,106,779 | 8/1978 | Zabcik | 277/177 |
| 4,279,424 | 7/1981 | Zerlauth | 277/83 |
| 4,293,291 | 10/1981 | Link | 277/27 |
| 4,346,903 | 8/1982 | Heiermann | 277/58 |
| 4,443,016 | 4/1984 | Schungel | 277/27 |
| 4,544,167 | 10/1985 | Giroux | 277/82 |
| 4,555,118 | 11/1985 | Saliger | 277/188 R |
| 4,576,387 | 3/1986 | Ghilardi et al. | 277/176 |
| 4,858,516 | 8/1989 | Klein | 277/27 |

FOREIGN PATENT DOCUMENTS 490601  2/1953  Canada ................................ 277/177

Primary Examiner—William A. Cuchlinski, Jr.
Assistant Examiner—Daniel G. DePumpo
Attorney, Agent, or Firm—Stanley Ktorides

[57] ABSTRACT

A seal assembly comprising a ring having radial and axial seals thereon positionable between mating parts for sealing flow of fluid from high to low pressure regions between the mating parts.

7 Claims, 2 Drawing Sheets ns. 4,982,889

FLOATING DUAL DIRECTION SEAL ASSEMBLY

TECHNICAL FIELD

This invention relates generally to the field of seals for sealing high from low pressure regions and more particularly to seals for sealing high from low pressure regions between mating parts of turbomachinery.

BACKGROUND ART

In machinery which processes fluid between high and low pressures there is a need to provide a seal between the high and low pressure regions in order to maintain efficient fluid processing operation. An example of such machinery is turbomachinery such as a turboexpander or a turbocompressor. Often the most appropriate place to position such a seal is between mating parts of such machinery since such mating parts will not form an effective seal just by themselves due to differential thermal movement of the parts, movement due to pressure differences, and fluid leakage because of the large pressure differences which are often involved. The machinery art has developed numerous seals for this application. Generally such seals are characterized by being on one of the mating parts and forms an effective seal when the other of the mating parts is properly positioned in the machinery.

A problem with this arrangement arises when the mating parts are such that their positioning is not easily observable with respect to the seal. That is, the positioning of the mating parts obscures vision of the seal as the parts are brought together. This creates the likelihood that the seal could be damaged during the assembly of the machinery and thus not function properly when the machinery is put into operation. The problem of seal damage during such a blind fit-up is even more acute when the sealing must be done in two directions e.g. both radially and axially.

Another problem arises if the parts themselves are misaligned initially or become misaligned during operation. Since the seal is on one of the parts, the misalignment compromises the effectiveness of the seal even if the seal itself is not damaged.

Accordingly it is an object of this invention to provide an improved seal assembly for sealing high and low pressure regions between mating parts of machinery.

It is another object of this invention to provide an improved seal assembly which reduces the likelihood of seal damage which might be caused when mating parts require a blind fit-up.

It is yet another object of this invention to provide an improved seal assembly which effectively seals high and low pressure regions between mating parts of machinery in two different directions.

It is a further object of this invention to provide an improved seal assembly which will enable effective seal operation even if mating parts are or become misaligned.

SUMMARY OF THE INVENTION

The above and other objects which will become apparent to those skilled in the art upon a reading of this disclosure are attained by the present invention which is:

A seal assembly for sealing between mating parts high and low pressure regions comprising:

(A) a ring positionable between said mating parts;

(B) a radial seal on the ring placeable radially adjacent one of the mating parts, said radial seal comprising a self-actuating member oriented on the ring for exposure to the high pressure; and (C) an axial seal on the ring placeable axially adjacent the other of the mating parts, said axial seal comprising a self-actuating member oriented on the ring for exposure to the high pressure.

As used herein, the term "mating parts" means any two parts intended for proximate positioning in an assembled apparatus. The individual parts may be one-piece or multi piece parts.

As used herein, the term "self actuating member" means any seal member capable of providing fluid tight sealing due to the action of high pressure on the seal member surfaces.

DETAILED DESCRIPTION

The seal assembly of this invention will be described in detail with reference to the Drawings.

Figure 1:
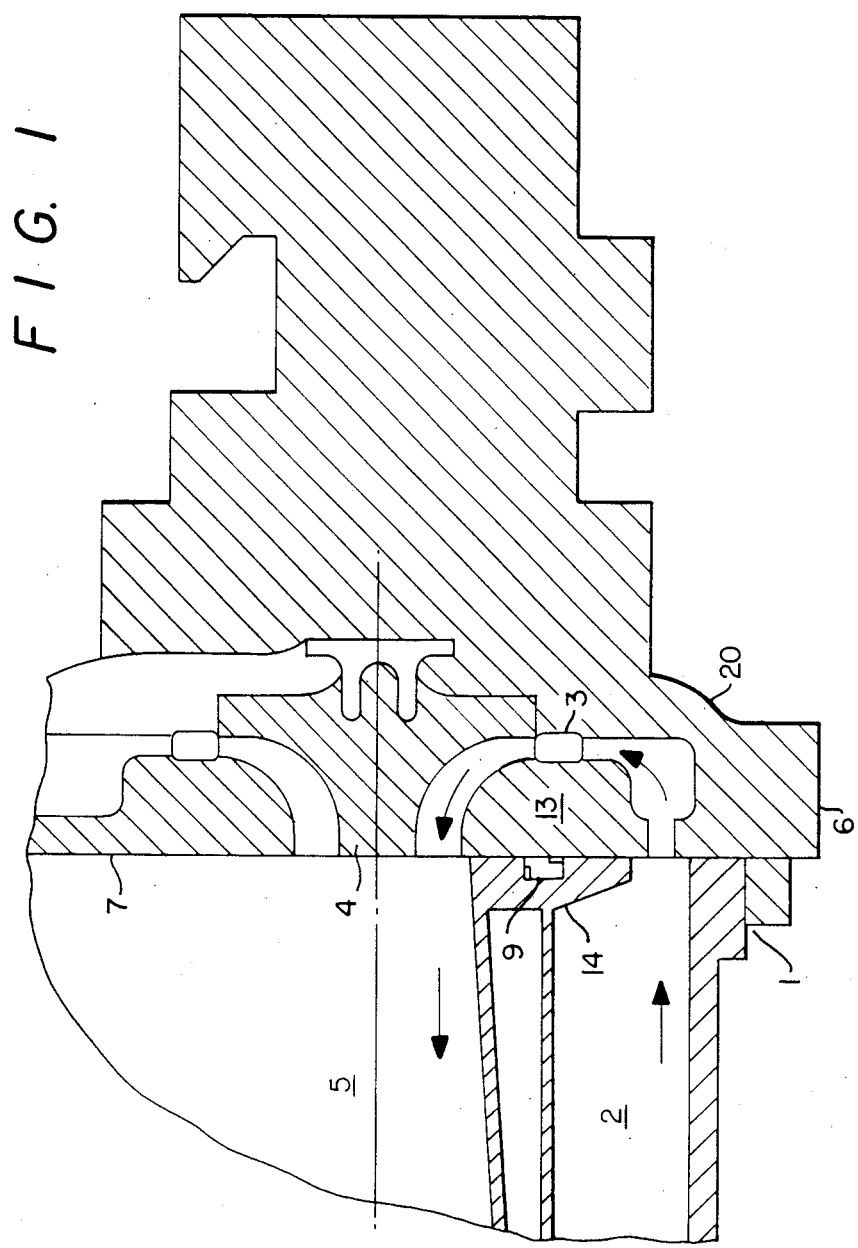
FIG. 1 is a simplified cross-sectional view of part of a turboexpander on which the seal assembly of this invention may be employed.

Referring now to FIG. 1, there is shown in simplified cross-section turboexpander 20. In the operation of this turboexpander high pressure inlet fluid is passed through annular inlet plenum 2 of housing 1 as shown by the directional arrows, through nozzles 3 and vaned impeller 4, and out through turbine diffuser 5. While passing through impeller 4 the fluid expands and causes the impeller to rotate and drive a shaft from which work may be recovered such as in the form of mechanical energy or electrical generation. The pressure difference between the fluid in plenum 2 and diffuser 5 can be quite high. Typically the high pressure fluid is at a pressure within the range of from 100 to 800 pounds per square inch absolute (psia) and the low pressure fluid is at a pressure within the range of from 15 to 100 psia. In the operation of a turbocompressor, the flow of fluid would be reversed and the rotating impeller would serve to pressurize the fluid.

Generally the machinery assembly 6 is detachable from the stationary housing 1 to facilitate maintenance, repair or replacement of the machinery. In the turboexpander illustrated in FIG. 1, the interface between the stationary housing and the machinery assembly would be along line 7. This interface is not fluid tight because, for example, the mating parts do not mate exactly, because of differential thermally induced movement of the mating parts and because of the high pressure differential between the high pressure region and the low pressure region. Fluid which leaks from the high pressure region to the low pressure region circumventing the rotating assembly is a source of operating inefficiency.

In the turboexpander illustrated in FIG. 1 it can be seen that a likely fluid leakage path from plenum 2 to diffuser 5 would be along interface 7 between turbine assembly face 13 and housing diffuser face 14. A typical prior art solution to this leakage problem is the placement of a seal on one of the two faces so that when the two faces are mated the seal blocks fluid flow along their interface. A problem with this solution is that the mating of the two parts often obscures the seal as the parts are brought close together and this obscureness may cause the seal to be damaged and thus not function properly during operation. Furthermore, such a seal, even if undamaged during assembly, can function effectively only as long as the mating faces are close together. For example, during operation thermal gradients may cause some axial displacement between the mating faces thus negating the seal's effectiveness.

Figure 2:
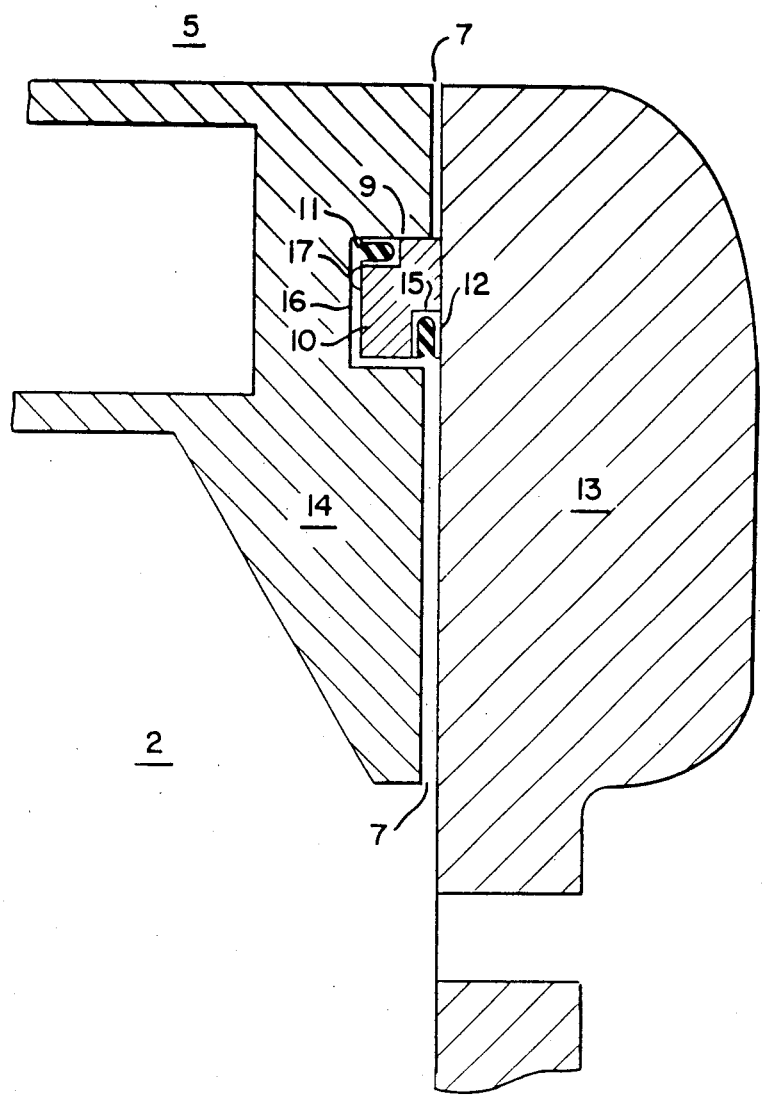
FIG. 2 is a cross-sectional representation of one embodiment of the seal assembly of this invention as it could be employed with a turboexpander.

These problems are addressed and solved by the floating dual direction seal assembly of this invention which is shown as seal assembly 9 in FIG. 1 and in greater detail in FIG. 2 which can be thought of as a rough detail view of a portion of FIG. 1. The numerals of FIG. 2 correspond to those of FIG. 1 for the common elements.

Referring now to FIG. 2, seal assembly 9 is used to seal fluid flow from high pressure region 2 to low pressure region 5 along interface 7 between turbine assembly face 13 and housing diffuser face 14. The seal assembly is not attached to either of these mating parts but rather is positioned in an annular groove within one of the parts, in this case within diffuser face 14. By being unattached to either of the mating parts, the seal assembly is allowed to move in an axial direction to compensate for any axial misalignment of the parts due either to initial imperfect assembly or to subsequent differential axial movement between the mating parts caused by thermal of pressure differences. This floating aspect of the seal assembly will be described more fully later.

Seal assembly 9 is comprised of ring member 10, radial seal member 11 and axial seal member 12. Ring 10 is shown in FIG. 2 in cross section; however it will be appreciated by those skilled in the art that ring member 10 is a curved piece which fits around, in this case, the diffuser housing. Ring 10 is generally circular although any effective curvature, such as an elliptical curvature can be employed. Ring 10 may be made of any suitable material which is dimensionally stable, capable of being machined to a high quality surface finish, and is compatible with the pressure and temperature of the intended operating environment. One such suitable material for the turboexpander application illustrated in FIGS. 1 and 2 is type 304 stainless steel. As shown in FIG. 2, ring 10 is positionable between mating parts 13 and 14, in this case within a groove on part 14.

On ring 10 and placeable radially adjacent one of the mating parts, is radial seal 11. In the embodiment illustrated in FIG. 2, radial seal 11 is on the inside diameter of ring 10 radially adjacent diffuser face part 14. In an application where the high pressure region was on the other side, i.e. in area 5, the radial seal 11 would be on the outer diameter of ring 10. On ring 10 and placeable axially adjacent the other of the mating parts is axial seal 12.

Radial seal 11 and axial seal 12 are both comprised of a self-actuating member oriented on the ring for exposure to the high pressure. In the embodiment illustrated in FIG. 2, both radial seal 11 and axial seal 12 are comprised of a U-shaped elastomer 15 which is oriented with the open part of the U capable of seeing the high pressure.

In operation, as high pressure fluid from high pressure region 2 passes through interface 7 between mating parts 13 and 14, the high pressure fluid flows into the U shaped elastomer and thus energizes or actuates both radial seal 11 and axial seal 12. The high pressure fluid causes the seal member to deflect thus forming a tight seal, radially against part 14 in the case of radial seal 11, and axially against part 13 in the case of axial seal 12. Thus high pressure fluid is stopped from passing past the seal through interface 7.

The seal material may be any material which effectively deflects under the influence of the high pressure fluid. Such materials include elastomers, such as Teflon ™, Viton ™, Kel-F ™, buna rubber and silicones, and metals, such as stainless steel, copper, Inconel ™ and Monel ™.

The seal shapes could be any effective self-energizing seals such as o-rings, O-rings c-rings or omni-seals.

Since the seal assembly of this invention is placed into position independently of the mating of the mating parts the problem of seal damage caused during blind fitting of the mating parts is overcome.

As discussed previously the mating parts could become axially misaligned because of initial misalignment or due to the effects of temperature or pressure. The seal assembly of this invention addresses this problem by enabling the ring to float under the effects of the high pressure so as to ensure a tight seal. Referring back to FIG. 2, as high pressure fluid passes from region 2 through interface 7 it is stopped from passing into low pressure region 5 through the remainder of interface 7 by expanded, i.e. energized, axial seal 12. As the high pressure fluid flows around ring 10 it is stopped from passing completely around ring 10 by expanded or energized radial seal 11. However, since the high pressure fluid is now in passage 16 this acts to push ring 10 against turbine assembly face 13. The greater is the pressure pushing parts 13 and 14 apart within interface 7, the greater is the pressure pushing ring 10 against part 13 to effect a good seal between the mating parts. Thus the seal assembly of this invention moves or floats to overcome any axial misalignment of the mating parts.

In order to assist the seal assembly of this invention to provide an effective seal when the pressure difference is not great, two further seal parts may be employed, either alone or in combination. The first is small raised section 17 which serves to maintain a minimum spacing in passage 16. The second is a spring (not shown) which serves to hold ring 10 against face 13 under low load. Furthermore, each of the seals may have their own energizing springs.

Now by the use of the seal assembly of this invention, one can mate parts easily without causing damage to an interfacial seal, can effectively seal fluid flow both radially and axially between mating parts, and can overcome poor seal performance due to axial misalignment of the mating parts.

Although the invention has been described in detail with reference to one specific embodiment, it will be appreciated by those skilled in the art that there are other embodiments of the invention within the spirit and scope of the claims.

I claim:

1. A floating dual direction seal assembly for sealing high and low pressure regions at the interface between mating parts of turbomachinery comprising:
   (A) a ring positionable between said mating parts in an annular groove within one of said mating parts and moveable axially at the interface between the mating parts;
   (B) a radial seal on the ring placeable radially adjacent one of the mating parts, said radial seal comprising a self-actuating member oriented on the ring for exposure to the high pressure;

(C) an axial seal on the ring placeable axially adjacent the other of the mating parts, said axial seal comprising a self-actuating member oriented on the ring for exposure to the high pressure; and (D) a raised section on the ring in contact with an axially facing surface of the annular groove serving to space the ring from said surface of the annular groove.

2. The seal assembly of claim 1 wherein the radial seal is on the inner diameter of the ring.

3. The seal assembly of claim 1 wherein the radial seal is on the outer diameter of the ring.

4. The seal assembly of claim 1 wherein at least one of the radial seal and the axial seal is comprised of elastomeric material.

5. The seal assembly of claim 1 wherein at least one of the radial seal and the axial seal has a U-shape and is oriented o the ring with the open part of the U capable of seeing the high pressure.

6. The assembly of claim 1 wherein the turbomachinery comprises a turbine assembly and a diffuser and the mating parts are the turbine assembly face and diffuser face.

7. The assembly of claim 6 wherein the annular groove is within the diffuser face.

* * * * *